United States Patent [19]

Alas

[11] Patent Number: 4,529,074

[45] Date of Patent: Jul. 16, 1985

[54] CLUTCH COVER MECHANISM AND PRESSURE PLATE THEREFOR

[75] Inventor: Jacques Alas, Eaubonne, France

[73] Assignee: Valeo, Paris, France

[21] Appl. No.: 601,251

[22] Filed: Apr. 17, 1984

[30] Foreign Application Priority Data

Apr. 18, 1983 [FR] France ................................. 83 06288

[51] Int. Cl.³ ............................................. F16D 13/72
[52] U.S. Cl. ............................... 192/70.12; 192/89 B; 192/113 A
[58] Field of Search ............... 192/70.12, 113 A, 89 B

[56] References Cited

U.S. PATENT DOCUMENTS

| | | | | |
|---|---|---|---|---|
| 1,767,309 | 6/1930 | Ricardo | ................................. | 74/604 |
| 2,205,629 | 6/1940 | Peterson | .......................... | 192/113 A |
| 2,770,341 | 11/1956 | Wobrock | .......................... | 192/70.12 |
| 2,885,047 | 5/1959 | Kehrl | ................................. | 192/70.12 |
| 4,020,937 | 5/1977 | Winter | ............................ | 192/107 R |

FOREIGN PATENT DOCUMENTS 2095772 10/1982 United Kingdom .

Primary Examiner—Craig R. Feinberg
Assistant Examiner—David A. Okonsky
Attorney, Agent, or Firm—Charles E. Brown

[57] ABSTRACT

A pressure plate for a clutch cover assembly for an automotive vehicle comprises, on the side opposite that through which it is adapted to operate on a friction disk, axially projecting cooling fins 24. Certain at least of these extend substantially from its inside perimeter to its outside perimeter. Oblique air circulation grooves are defined between them. Over at least part of their length, the air circulation grooves are closed off in the axial direction, on the side opposite the pressure plate, by a separate confinement member which is attached to the pressure plate.

11 Claims, 4 Drawing Figures

CLUTCH COVER MECHANISM AND PRESSURE PLATE THEREFOR

BACKGROUND OF THE INVENTION

1. Field of the Invention

The present invention is generally concerned with clutch cover assemblies, that is to say the assembly of parts which in order to make up a clutch, in particular for an automotive vehicle, is fastened as a unit to a reaction plate or flywheel with a friction disk disposed between them.

2. Description of the Prior Art

As is known, a clutch cover assembly generally comprises a first generally annular member called the cover through which it is adapted to be attached to the associated reaction plate, a second generally annular member called the pressure plate, which is constrained to rotate with said cover whilst being mounted so as to be movable axially relative to the latter and which is adapted to clamp the friction disk axially against said reaction plate, and elastic means which, for the purposes of this clamping or engagement, urge said pressure plate in the direction towards said reaction plate, said elastic means bearing for this purpose on the cover so as to exert a force in the axial direction on the pressure plate.

Elastic means of this kind may, for example, form part of a third generally annular member called the diaphragm spring which is inserted axially between the pressure plate and the cover and comprises, on the one hand, a circumferentially continuous peripheral part forming a Belleville washer and constituting said elastic means and, on the other hand, a central part subdivided into radial fingers by slots, said central part forming levers by means of which the assembly may be operated to disengage it.

In practice, a diaphragm spring of this kind usually and at present bears directly on the pressure plate, the pressure plate having for this purpose an annular bead projecting in the axial direction, possibly circumferentially subdivided into separate bosses.

Be this as it may, in service the internal volume of a clutch cover assembly of this kind is inevitably subjected to an increase in temperature, in particular due to friction forces which are developed between the friction disk on the one hand and, on the other hand, the pressure and reaction plates, each time the clutch is disengaged and each time it is engaged.

To ventilate this internal volume so as to maintain the temperature within acceptable limits, it has already been proposed to provide the pressure plate with cooling fins which project axially from the side opposite that through which it is adapted to act on the friction disk and which delimit between them air circulation grooves which are oblique relative to a radial plane passing through their median area.

Arrangements of this kind are described inter alia in U.S. Pat. Nos. 1,767,309, 2,770,341, 2,885,047 and 2,205,629.

In U.S. Pat. No. 1,767,309, the cooling fins employed extend substantially from the inside perimeter of the pressure plate to its outside perimeter.

However, the elastic means disposed between the cover and the pressure plate are helical coil springs in this instance, arranged axially, and thus the cooling fins alternate circumferentially with these springs, which are relatively bulky.

Apart from the fact that their numbers are correspondingly reduced, the circulation of air between the grooves delimited by the fins is inevitably disturbed by these springs, which is prejudicial to the effectiveness of the ventilation required.

In U.S. Pat. Nos. 2,770,341 and 2,885,047, the elastic means disposed axially between the cover and the pressure plate consist of the circumferentially continuous peripheral part of a diaphragm spring and, as indicated hereinabove, this bears axially on circumferentially disposed bosses provided for this purpose on said pressure plate.

The cooling fins conjointly employed are of only limited extent, these fins extending from said bosses either in the direction towards the inside perimeter of the pressure plate, as is the case in U.S. Pat. No. 2,770,341, or in the direction towards the outside perimeter of the latter, as is the case in U.S. Pat. No. 2,885,047.

The required ventilation is correspondingly reduced.

Moreover, in these U.S. Pat. Nos. 1,767,309, 2,770,341 and 2,885,047 the air circulation grooves defined by the cooling fins which may be employed are open in the axial direction on the side opposite the pressure plate, extending freely in the axial direction from the latter.

As a result, these cooling fins operate more through agitating the air than by forced circulation thereof.

Their effectiveness with regard to the required ventilation is then less than certain.

In U.S. Pat. No. 2,205,629 the air circulation grooves are closed off in the axial direction, on the side opposite the pressure plate, by a member referred to hereinafter for convenience as the confinement member.

However, in this U.S. Pat. No. 2,205,629 this confinement member is an integral part of the pressure plate, the air circulation grooves being formed in its thickness.

As a result, the pressure plate is complex and costly to manufacture.

A general objective of the present invention is an arrangement with which this disadvantage may be circumvented and further providing additional advantages.

SUMMARY OF THE INVENTION

In one aspect, the present invention consists in a clutch cover assembly pressure plate comprising projecting cooling fins on the side opposite that which is adapted to operate on a friction disk and certain at least of which are relatively longer cooling fins which extend substantially from its inside perimeter to its outside perimeter and delimit between them air circulation grooves which are oblique to a radial plane passing through their median area, a distinct and separate confinement member adapted to close off said air circulation grooves in the axial direction over at least part of their length and on the side opposite the pressure plate and fixing means whereby said confinement member is rigidly attached to said pressure plate by fixing means.

A confinement member of this kind advantageously defines with the air circulation grooves true channels within which, by virtue of the resulting confinement, the circulation of air is forced, that is to say accelerated, which is of positive benefit with regard to the required ventilation.

Moreover, it provides a very simple manner of overcoming the perennial problem of interference between the air circulation grooves on the one hand and, on the other hand, either the axial springs when the elastic means disposed between the cover and the pressure plate consist of axial springs of this kind, or the bead or the bosses on the pressure plate needed for the diaphragm spring to bear on when these elastic means consist of a diaphragm spring of this kind.

With the pressure plate in accordance with the invention, these elastic means no longer bear directly on the pressure plate, but rather on the confinement member which is attached to it.

In other words, it is through the intermediary of this confinement member that said elastic means are operative axially on the pressure plate.

In the case, for example, of the circumferentially continuous peripheral part of a diaphragm spring forming a Belleville washer, the confinement member in accordance with the invention has a projecting annular bead adapted for the latter to bear on it.

Be this as it may, the only structural parts which then interfere with the air circulation grooves are the fixing means needed to attach the confinement member to the pressure plate.

These means are limited in number and overall dimensions, however.

Thus the required circulation of air between the inside perimeter of the pressure plate and its outside perimeter is only slightly affected.

In another aspect, the present invention consists in a clutch cover assembly comprising a pressure plate equipped with a confinement member of the kind in accordance with the invention as defined hereinabove.

This confinement member may be of stamped sheet metal, for example.

In this case, where the cover is also of stamped sheet metal and the clutch is a "pull" type diaphragm clutch, that is to say a clutch in which the diameter of the circumference along which the diaphragm spring acts on the pressure plate, through the intermediary of the confinement member in this instance, is less than that of the circumference along which it bears on the cover, the outside peripheral contour of said confinement member preferably has, in accordance with another feature of the invention, a radius which is less than or the same as that of the inside contour of said cover.

The confinement member and the cover may then with advantage be formed from identical blanks, by appropriately cutting and stamping same.

The cost of the assembly is thus minimized.

Furthermore, by virtue of the confinement member in accordance with the invention, the diaphragm spring is advantageously supported in the same way on both sides.

The confinement member in accordance with the invention also finds an application, however, in the case of a "push" type clutch, that is to say a clutch in which, in the case of a diaphragm clutch, for example, the diameter of the circumference along which said diaphragm spring must act on the pressure plate is greater than that of the circumference along which it bears on the cover.

Thus the same pressure plate may with advantage be used for a "pull" type diaphragm clutch or a "push" type diaphragm clutch, facilitating standardization of same.

All that is required, retaining the same fixing points, is to fit to this pressure plate either a confinement member with a bead appropriate to a "pull" type clutch or a confinement member with a bead appropriate to a "push" type clutch.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
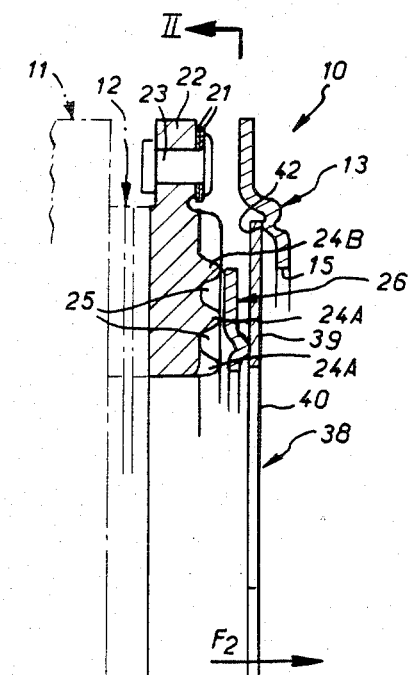
FIG. 1 is a view of a clutch cover assembly equipped with a pressure plate in accordance with the invention seen in axial cross-section on the line I—I in FIG. 2.

As shown in FIG. 1, the clutch cover assembly 10 in accordance with the invention is designed, in a manner known per se, to be attached to a reaction plate 11 which is only partially and schematically represented in FIG. 1, with inserted between it and said reaction plate 11 a friction disk 12 which is also shown only partially and schematically in FIG. 1.

In a manner also known per se, the clutch cover assembly 10 in accordance with the invention comprises a first generally annular member 13 called the cover through which it is adapted to be attached to the reaction plate 11.

This cover 13 comprises a bottom 14 in which is a central opening 15, a lateral wall 16 which extends in a generally axial direction, and, at the end of the latter, a transverse rim 17 which extends in a generally radial direction and in which are spaced holes 18 for the screws which attach the assembly to the reaction plate 11 to pass through.

The central opening 15 in the cover 13 defines its inside peripheral contour.

This is in practice a circular contour of radius $R_1$.

For clamping the friction disk 12, the clutch cover assembly 10 comprises a second generally annular member 20 which is constrained to rotate with the cover 13 whilst being movable axially relative to the latter.

In the embodiments shown and as schematically indicated in the figures, the pressure plate 20 is, to this end and in a manner known per se, coupled to the cover 13 by elastically deformable tangs 21 which extend substantially tangentially to a circumference of the assembly.

For example, three sets of such tangs 21 are provided, regularly distributed circumferentially in pairs, at 120°, each comprising two superposed tangs 21, as shown.

Each of these sets of tangs 21 extends between, on the one hand, a lug 22 on the pressure plate 20 which projects radially for this purpose at the outside perimeter of the latter, and to which it is fastened by a rivet 23, and, on the other hand, a portion of the radial rim 17 of the cover 13 which, by virtue of arrangements which are not shown in the figures, is offset axially in the direction towards the bottom 14 of the latter relative to the main part of the radial rim 17, and to which it is also fastened by a rivet.

In a manner known per se, the pressure plate 20 comprises, on its side opposite that through which it is adapted to act on the friction disk 12, axially projecting cooling fins 24A, 24B of which certain at least, namely the fins 24A referred to hereinafter for convenience as the long cooling fins, extend substantially from its inside perimeter to its outside perimeter, or at least to the vicinity of the latter, and delimit between them air circulation grooves 25 which are oblique to a radial plane passing through their median area.

In other words, the long cooling fins 24A extend obliquely from the outside perimeter of the pressure plate 20 to its inside perimeter, there being a circumferential offset between their end on said outside perimeter and their end on said inside perimeter, whereas the cooling fins 24B, which are shorter and are therefore referred to hereinafter for convenience as the short cooling fins, extend obliquely in a similar manner, the arrangement to be described in detail subsequently.

Over part at least of their length, the air circulation grooves 25 are closed off in the axial direction, on the side opposite the pressure plate 20, by a member 26 referred to hereinafter for convenience as the confinement member, which is rigidly attached to said pressure plate 20.

In accordance with the invention, this confinement member 26 constitutes a distinct and separate part from the pressure plate 20 and is attached to the latter from place to place by means of appropriate fixing means.

Figure 2:
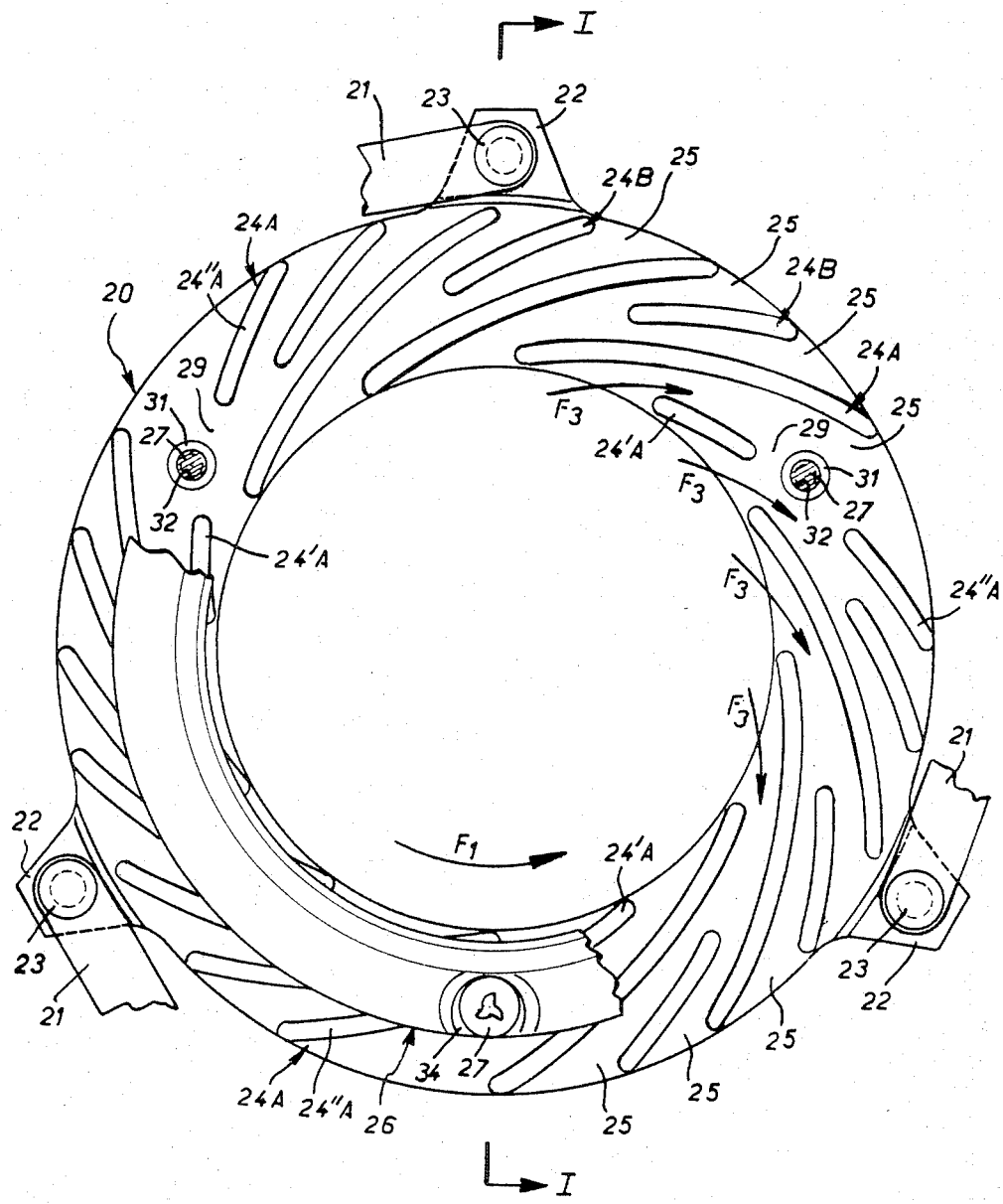
FIG. 2 is a partially cutaway view in transverse cross-section on the line II—II in FIG. 1.

In the embodiment shown in FIGS. 1 and 2, these fixing means consist of axial screws 27; as an alternative (FIG. 3) they are rivets 27'.

Be this as it may, these fixing means, of which there are in practice three in the embodiment shown, and which are regularly spaced in the circumferential direction in pairs at 120°, are each individually disposed in a gap 29 locally interrupting a long cooling fin 24A.

In other words, the long cooling fins 24A concerned are each subdivided into two distinct sections 24'A, 24"A, generally continuous with one another, being disposed each on its own side of the corresponding gap 29.

Figure 3:
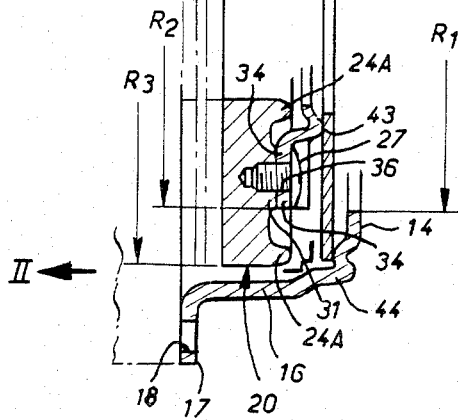
FIG. 3 repeats part of FIG. 1 and concerns an alternative embodiment.

In a gap 29 of this kind the pressure plate 20 has, projecting slightly in the axial direction to provide for the fitting of the corresponding fixing means, a boss 31 with a circular contour in which is formed a hole to receive said fixing means; this consists, in the embodiment shown in FIGS. 1 and 2, of a threaded blind hole 32 or, in the embodiment shown in FIG. 3, of a hole 32' which passes right through the pressure plate 20, opening out on the opposite side into a housing 33 which is set back relative to the surface of the pressure plate 20 intended to cooperate with the friction disk 12 so as to accommodate the base of the rivet 27' concerned.

For preference, and as shown here, the bosses 31 which the pressure plate 20 thus features for fitting the fixing means provide for attaching to it the confinement member 26 which occupies a substantially central position of the pressure plate 20, that is to say a position which is substantially halfway between the inside and outside perimeters of the latter.

In the embodiments shown, the confinement member 26 is a generally annular member stamped from sheet metal.

Through its radially outermost peripheral part at least, which is generally plane and extends transversely relative to the axis of the assembly, it touches the underlying cooling fins 24A, 24B, being immediately in the vicinity of the crest of the latter, as shown, or even in contact with this crest.

However, to provide for the fitting of the fixing means which attach it to the pressure plate 20 it features spaced bosses 34 which are set back in the axial direction relative to the main part of its radially outermost peripheral part.

The number of these bosses 34 is the same as the number of the bosses 31 on the pressure plate 20, and each features a hole 36 for the corresponding fixing means to pass through. At each of each of these bosses 34 the confinement member 26 is held in contact with the corresponding boss 31 of said pressure plate 20 by one of these fixing means.

In the embodiments shown, the confinement member 26 extends radially over only part of the pressure plate 20.

While its inside peripheral contour has substantially the same radius as the inside peripheral contour of the pressure plate 20, its outside peripheral contour has, in the embodiments shown and for reasons to be explained hereinafter, a radius $R_2$ which is less than that $R_3$ of the outside peripheral contour of the pressure plate 20.

As a result, in these embodiments, the air circulation grooves 25 are closed off in the axial direction over part only of their length by the confinement member 26.

However, as an alternative to this and if required, they may be totally closed off in the axial direction by the confinement member 26 over their full length, said confinement member 26 then having inside and outside peripheral contours with respective radii substantially equal to the corresponding radii of the pressure plate 20.

In practice, in the embodiments shown there are no short cooling fins 24B between each of the long cooling fins 24A locally interrupted by a gap 29 and that immediately following it in the circumferential direction from its end on the outside perimeter of the pressure plate 20 to its end on the inside perimeter of the latter, as indicated by the arrow F1 in FIG. 2.

With this single exception, there are short cooling fins 24B alternating with all the long cooling fins 24A.

In other words, in the embodiments shown the number of short cooling fins 24B is equal to the number of long cooling fins 24A less the number of screws 27 or rivets 27' used to attach the confinement member 26 to the pressure plate 20.

Also, in these embodiments, the short cooling fins 24B in practice extend from the outside perimeter of the pressure plate to a point substantially in the median area of the latter.

The clutch cover assembly 10 in accordance with the invention finally comprises, in a manner known per se, elastic means which, in order to bear axially on the pressure plate 20 and thus urge the latter in the direction towards the reaction plate 11 so as to clamp or engage the friction disk 12, bear on the cover 13.

In a manner also known per se, in the embodiments shown these elastic means form part of a third generally annular member 38 called the diaphragm spring which, inserted axially between the pressure plate 20 and the cover 13, comprises on the one hand a circumferentially continuous peripheral part 39 forming a Belleville washer constituting said elastic means and, on the other hand, a central part 40 subdivided by slots into radial fingers by means of which it is adapted to be acted on by a clutch release bearing (not shown) in order to release or disengage the friction disk 12.

In practice, the diaphragm spring 38 bears on the bottom 14 of the cover 13 through its circumferentially continuous peripheral part 39, the cover 13 having for this purpose an annular bead 42 projecting in the axial direction towards the pressure plate 20.

As the cover 13 is stamped from sheet metal in the embodiment shown, the bead 42 is simply formed by stamping.

In accordance with the one aspect of the invention, it is through the intermediary of the confinement member 26 that, conjointly, through its circumferentially continuous peripheral part 39, the diaphragm spring 38 acts in the axial direction on the pressure plate 20.

In the embodiments shown, it bears on the confinement member 26 in the axial direction, the latter member featuring for this purpose an annular bead 43 projecting axially in the vicinity of its inside perimeter, in the direction towards the bottom 14 of the cover 13.

Like the annular bead 42 on the cover 13, this annular bead 43 is obtained in practice simply by stamping the sheet metal which constitutes the confinement member 26 in the embodiments shown.

The embodiments shown in FIGS. 1 to 3 relate to a "pull" type clutch, that is to say a clutch in which the associated clutch release bearing must operate in traction on the central part 40 of the diaphragm spring in the direction of the arrow F2 in FIG. 1, that is in the axial direction from the pressure plate 20 towards the bottom 14 of the cover 13, and the diameter of the circumference along which this diaphragm spring 38 acts axially on the pressure plate 20, through the intermediary of the confinement member 26, is therefore less than that of the circumference along which it bears axially on the cover 13.

It follows that no special coupling means are required between the diaphragm spring 38 and the cover 13, except for stampings 44 which are formed from place to place or circumferentially continuously on the lateral wall 16 of cover 13, to center the diaphragm spring 38 relative to the latter.

It is for this reason that, as indicated hereinabove, the inside peripheral contour of the cover 13 is coincident with that of its central opening 15, which is circular.

To benefit from this arrangement, the radius $R_2$ of the outside peripheral contour of the confinement member 26 is, in accordance with one feature of the invention, less than or the same as that $R_1$ of the inside peripheral contour of the cover 30.

As a result, the confinement member 36 and the cover 13 may with advantage be formed from the same blank, appropriately cut and stamped.

In other words, in accordance with this feature of the invention, the confinement member 26 is formed from what is normally waste material from the manufacture of the cover 13.

Be this as it may, in service and with the assembly assumed to be rotating in the circumferential direction indicated by the arrow F1 in FIG. 2, the cooling fins 24A, 24B carried by the pressure plate 20 function in the same manner as the blades of a pump, by virtue of their oblique disposition.

Taking up warm air at the inside perimeter of the pressure plate 20, within the axial volume of the assembly, they direct this air to the outside perimeter of said pressure plate 20, as shown by the arrows F3 in FIG. 2, by means of the air circulation grooves 25 delimited between them, and so evacuate it.

Because of the confinement member 26 in accordance with the invention such circulation of air occurs under particularly favourable and regular conditions, only the fixing means for the confinement member 26, which are of relatively reduced dimensions, being located on the path of such circulation and the consequences of this being minimized by the fact that said fixing means are sited in respective gaps in certain of the corresponding cooling fins, benefiting thus from the thickness of the latter.

Also, because of the confinement member 26 in accordance with the invention the circulation of air is advantageously accelerated, by virtue of the conduit which it provides for the air thus evacuated.

Figure 4:
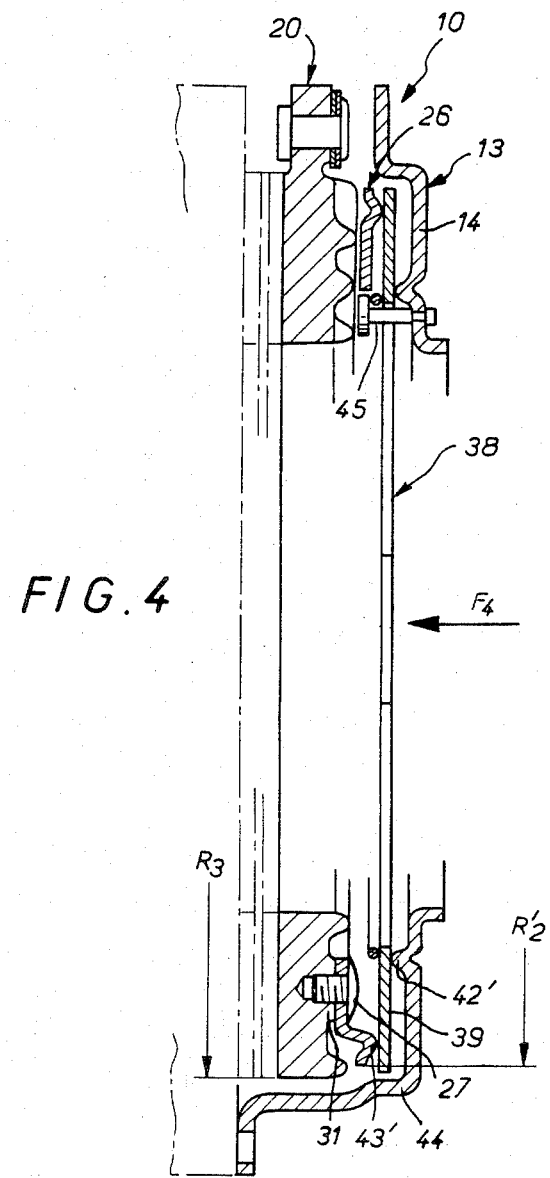
FIG. 4 is a view in axial cross-section analogous to that of FIG. 1 and relates to another clutch cover assembly equipped with a pressure plate in accordance with the invention.

FIG. 4 illustrates the application of the invention to a "push" type clutch, that is to say a clutch for which the associated clutch release bearing must push on the central part 40 of the diaphragm spring 38, in the direction of the arrow F4 in FIG. 4, and thus in the axial direction from the bottom 14 of the cover 13 towards the pressure plate 20.

In this case, the diameter of the circumference along which, through the intermediary of the confinement member 26, the diaphragm spring 38 acts on the pressure plate 20 is greater than that of the circumference along which it bears in the axial direction on the cover 13, and said diaphragm spring 38 is mounted tilting fashion on said cover 13, between where it bears on the latter and, for example and as shown here, a ring 44 carried by plates 45 fixed to and axially projecting from the cover 13.

In practice, as previously, the circumferentially countinuous part 39 of the diaphragm spring 38 bears on an annular bead 42' on the cover 13 and on an annular bead 43' on the confinement member 26.

However, in this case, the confinement member 26 has an outside peripheral contour of radius $R_2$ similar to that $R_3$ of the outside peripheral contour of the pressure plate 20 and, instead of being adjacent its inside peripheral contour, like the previous annular bead 43, its annular bead 43' is near its outside peripheral contour.

Conjointly in the embodiment shown, its inside peripheral contour has a radius greater than that of the inside peripheral contour of the pressure plate 20.

On the other hand, by virtue of the substantially central position of the bosses 31, the pressure plate 20 may with advantage be the same as previously, whether the confinement member 26 is attached to it by means of screws 27, as shown here, or with rivets, as in the embodiment shown in FIG. 3.

It should also be noted that, through appropriate disposition of its annular bead, the confinement member 26 in accordance with the invention advantageously provides bearing support for the diaphragm spring 38 along circumferences of different diameters, conditioned by constraints to be complied with for the intended applications.

It will be understood that various changes in the details, materials and arrangements of parts, which have been herein described and illustrated in order to explain the nature of the invention, may be made by those skilled in the art within the principle and scope of the invention as expressed in the appended claims.

For example, the number and configuration of the cooling fins employed may be modified, so that all may be "long" fins, for example, that is to say fins which extend substantially from the outside perimeter to the inside perimeter of the pressure plate. Likewise, the radial dimension of the confinement member relative to these cooling fins may also be modified.

I claim:

1. Clutch cover assembly pressure plate comprising projecting cooling fins on the side opposite that which is adapted to operate on a friction disk and certain at least of which are relatively longer cooling fins which extend substantially from its inside perimeter to its outside perimeter and delimit between them air circulation grooves which are oblique to a radial plane passing through their median area, a distinct and separate confinement member adapted to close off said air circulation grooves in the axial direction over at least part of their length and on the side opposite that which is adapted to operate on a friction disk and fixing means whereby said confinement member is rigidly attached to said pressure plate.

2. Pressure plate according to claim 1, wherein said fixing means are substantially centrally located on the pressure plate, at positions substantially halfway between its inside and outside perimeters.

3. Pressure plate according to claim 1, further comprising relatively shorter cooling fins and wherein said relatively longer cooling fins, which extend substantially from its inside perimeter to its outside perimeter, alternate with said relatively shorter cooling fins.

4. Pressure plate according to claim 3, wherein said relatively shorter cooling fins extend from said outside perimeter of said pressure plate.

5. Pressure plate according to claim 3, wherein said fixing means for said confinement member are each disposed in a gap locally interrupting a relatively longer cooling fin.

6. Pressure plate according to claim 5, wherein each interrupted relatively longer cooling fin is disposed between a relatively longer and shorter cooling fin, wherein the alternating of the relatively shorter cooling fins and relatively longer cooling fins continues between each interrupted cooling fin.

7. Clutch cover assembly comprising a generally annular cover by means of which it is adapted to be attached to a reaction plate, a generally annular pressure plate which is constrained to rotate with said cover whilst being movable axially relative thereto, and elastic means operative axially between said cover and said pressure plate, wherein said pressure plate comprises projecting cooling fins on the side opposite that which is adapted to operate on a friction disk and certain at least of which are relatively longer cooling fins which extend substantially from its inside perimeter to its outside perimeter and delimit between them air circulation grooves which are oblique to a radial plane passing through their median area, a distinct and separate confinement member adapted to close off said air circulation grooves in the axial direction over at least part of their length and on the side opposite that which is adapted to operate on a friction disk and fixing means whereby said confinement member is rigidly attached to said pressure plate.

8. Clutch cover assembly according to claim 7, wherein said elastic means are operative axially on the pressure plate through the intermediary of said confinement member.

9. Clutch cover assembly according to claim 7, further comprising a generally annular diaphragm spring which has a circumferentially continuous peripheral part which constitutes a Belleville washer which forms said elastic means and a central part subdivided by slots into radial fingers, wherein said diaphragm spring bears through its circumferentially continuous peripheral part on said confinement member which to this end comprises an annular bead which projects in the axial direction.

10. Clutch cover assembly according to claim 7, wherein said confinement member is stamped out of sheet metal.

11. Clutch cover assembly according to claim 10, wherein said cover is also stamped out of sheet metal and the radius of the outside perimeter of said confinement member is generally the same as that of the inside perimeter of said cover, whereby said confinement member and said cover is stamped from identical blanks.

* * * * *